United States Patent
Gross et al.

(10) Patent No.: US 6,244,860 B1
(45) Date of Patent: Jun. 12, 2001

(54) APPARATUS AND PROCESS FOR PRODUCING PERLITE

(75) Inventors: Gerhard Gross, Willich; Willi Baum, Selm, both of (DE)

(73) Assignee: Messer Griesheim GmbH (DE)

(*) Notice: Subject to any disclaimer, the term of this patent is extended or adjusted under 35 U.S.C. 154(b) by 0 days.

(21) Appl. No.: 09/449,225

(22) Filed: Nov. 24, 1999

(30) Foreign Application Priority Data

Nov. 25, 1998 (DE) .............................. 198 54 390

(51) Int. Cl.[7] ...................................... F27B 5/14
(52) U.S. Cl. ................ 432/219; 432/175; 432/213; 431/187; 431/284; 431/285
(58) Field of Search .................. 432/54, 175, 184, 432/209, 213, 218, 219; 431/10, 159, 187, 284, 285, 353

(56) References Cited

U.S. PATENT DOCUMENTS

| | | | |
|---|---|---|---|
| 4,523,530 | * 6/1985 | Kaminaka et al. | 431/284 |
| 4,622,007 | * 11/1986 | Gitman | 431/10 |
| 5,217,363 | * 6/1993 | Brais et al. | 431/187 |
| 5,611,683 | * 3/1997 | Baukal, Jr. et al. | 431/10 |
| 5,651,320 | * 7/1997 | Leisse et al. | 110/262 |
| 5,724,901 | * 3/1998 | Guy et al. | 431/284 |
| 5,829,369 | * 11/1998 | Sivy et al. | 431/10 |
| 5,957,678 | * 9/1999 | Endoh et al. | 431/353 |

* cited by examiner

*Primary Examiner*—Gregory Wilson
(74) *Attorney, Agent, or Firm*—Connolly Bove Lodge & Hutz LLP

(57) ABSTRACT

In an apparatus for producing perlite granules, having an expansion tube and one or more burners arranged at one end of the expansion tube, the combustion air is blown into the flame through one or more combustion air nozzles. An additional subsonic nozzle is arranged in at least one combustion air nozzle. In a process for expanding raw perlite in the updraft from a flame, with the introduction of oxygen or oxygen-enriched air into this flame, the oxygen or oxygen-enriched air is introduced axially into the flame through subsonic nozzles.

7 Claims, 2 Drawing Sheets

APPARATUS AND PROCESS FOR PRODUCING PERLITE

BACKGROUND OF INVENTION

The present invention relates to an apparatus for producing perlite granules and a process for expanding raw perlite to form perlite granules in the updraft.

The heat treatment of inert materials in an oxidizing atmosphere in the updraft, such as the melting and the expansion of perlite particles to form perlite granules, is known.

Because of their properties, perlite granules are used, inter alia, as an insulation material, filtration material or as horticultural granules. During the production, the starting material used is the so-called raw perlite. Raw perlite is a natural glass of volcanic origin which contains 3 to 6% by weight of chemically bound water of hydration. The raw perlite is reduced to grain sizes between 0.125 and 2.24 mm and classified to the grain-size distribution necessary for the properties of the final product.

The raw perlite particles are melted by being heated to temperatures above 1000° C. As a result of the water hydration, which is driven out and evaporated beginning at 800° C., the melted particles expand to a multiple of their initial volume.

Nowadays the vertical kiln, as compared with the horizontally rotating kiln, has largely become widespread as the apparatus for producing perlites.

The vertical kiln comprises a vertical expansion tube made of heat-resistant steel, which is heated from below by a flame. Heat losses as a result of heat radiation are minimized by a refractory insulation, which is fitted at a distance around the expansion tube.

The granular, dried raw perlite is metered directly into the flame in the region of temperatures above 1000° C. through openings made in the periphery of the expansion tube. Depending on the raw perlite grain size, the flame temperature and the residence time, the individual grain is melted and expanded by the evaporating water of hydration. Because of the lift forces resulting from this increase in volume, the expanded particles are carried out upwards by the exhaust gas from the flame. The expanded perlite is separated from the waste gas in a downstream cyclone, extracted by a cellular wheel, cooled and temporarily stored in silos.

The fuel used for the vertical kiln is combustible gases natural gas, propane and butane, as well as heating oil. The fuel is burned hyperstoichiometrically, which means with an excess of air, using air as the oxidation medium.

The maximum permissible operating temperature of the expansion tubes depends on the material. The material generally used is a heat-resistant steel.

The temperature in the furnace is typically between 850° C. and 950° C. During operation, low wall temperatures are aimed at in order to increase the service life, since scaling occurs to an increased extent above 900° C.

The expansion of the raw perlite particles is essentially influenced by the position and the three-dimensional extent of the hot flame zone and the temperature of the latter. The temperature can be influenced by the nozzle geometry of the burner, the fuel/air ratio and by the furnace pressure, that is to say the supply of additional air, but only within specific limits without the permissible operating temperatures being exceeded. The inert nitrogen component in the combustion air, and the excess air in the flame, additionally limit the temperature in the combustion zone and therefore the transfer of heat to the raw perlite particles. As a result, given an existing cross section of the expansion tube, the throughput of expanded perlite granules with a defined bulk density is limited.

Furthermore, the thermal expansion of perlite uses a great deal of energy, having an overall efficiency of less than 30%, depending on the raw particle diameter and the melting point of the raw perlite.

In the existing raw perlite expansion furnaces there is therefore a fundamental interest in improving productivity, that is to say in increasing the throughput of expanded perlite. In addition, the consumption of energy should be reduced.

It is known to increase the throughput of perlite expansion furnaces by enriching the combustion air with oxygen, mixing the combustion air enriched with oxygen together with the fuel gas and adding it through suitable burners into the expansion tube for combustion (U.S. Pat. No. 4,179,264). In this process of oxygen enrichment, which is simple to implement, the throughput of expanded perlite can be increased by a maximum of 30% without the permissible wall temperatures being exceeded.

During the enrichment process, the uniform increase in the oxygen concentration in the primary air simultaneously raises the temperature in the reaction zone, and hence improves the transfer of heat to the raw perlite particles. This means that the throughput of raw perlite can be increased in this way. However, since the location and the extent of the reaction zone or the flame front cannot be changed, the possible increase in the throughput is limited, since the residence time remains constant.

Furthermore, higher oxygen concentrations lead to problems with regard to scaling of the expansion tube and its mechanical strength.

SUMMARY OF INVENTION

The object of the invention is to provide an apparatus and a process for expanding raw perlite which, without the known disadvantages and risks of oxygen enrichment, permit the throughput of raw perlite in the apparatus to be increased significantly and the specific energy requirement to be reduced without the permissible wall temperatures being exceeded and without unexpanded raw perlite falling through the burner.

According to the invention, the object is achieved in that, in an apparatus for producing perlite granules, having an expansion tube and one or more burners arranged at one end of the expansion tube, in which apparatus the combustion air is blown into the flame through one or more combustion air nozzles, an additional subsonic nozzle is arranged in at least one combustion air nozzle.

In the apparatus for producing perlite granules, having an expansion tube, the expansion tube is preferably approximately vertical, which means that the longitudinal axis of the expansion tube extends exactly vertically or with relatively small deviations, for example a few degrees, from the vertical position. The burner is then preferably arranged at the lower end of the vertical expansion tube.

In the apparatus, the raw perlite is preferably expanded in the updraft from a flame, with the introduction of oxygen or oxygen-enriched air into this flame. This apparatus is referred to here as an "updraft reactor".

The object is also achieved by a process for expanding raw perlite in the updraft from a flame, with the introduction of oxygen or oxygen-enriched air into this flame, which is defined by the fact that the oxygen or oxygen-enriched air is introduced axially into the flame through subsonic nozzles.

The apparatus according to the invention comprises a burner, which is preferably flange-mounted to the lower end of the vertical expansion tube, the fuel gas and the primary air preferably being blown into the expansion tube through a central individual nozzle having a concentric annular-gap primary air nozzle or through concentric individual nozzles inside the primary air nozzle. The fuel gas can be blown into the primary air stream both in parallel and transversely. The fuel gas and the primary air can emerge from the burner nozzles both in externally mixing form and in premixed form. Air can be blown in through the secondary air nozzle, which is preferably arranged concentrically around the primary air nozzle, using a separate blower. However, it is also possible for secondary air or additional air to be sucked in only on account of a negative pressure in the expansion tube.

The oxygen is blown axially into the primary air flame through a subsonic nozzle, which is preferably arranged centrally in the burner. The nozzle exit velocity is preferably between 5 m/s and 100 m/s. It is advantageously possible for pure oxygen or oxygen-enriched air with a proportion of oxygen of preferably at least 50% by volume to be blown in.

Higher oxygen exit velocities of 100 m/s have the effect of shortening the flame length, because of the high mixing energy. As a result of the reduced layer thickness of the high-temperature zone, the residence time is reduced at higher raw perlite throughputs, which means that the raw perlite particles fall unexpanded through the flame. At the same time, the combustion zone is displaced in the direction of the burner nozzle, the flame begins to pulsate and the furnace goes out. In addition to a considerable reduction in throughput, the energy consumption increases disproportionately.

As a result of the reduction in the oxygen velocity in the range between 5 m/s and 100 m/s, according to the invention the primary flame is lengthened, depending on the velocity, and the temperature in the reaction zone is increased, without the permissible wall temperature being exceeded. As a result of the improved heat transfer and the longer residence time, the throughput of raw perlite can be increased by 50%, and the specific energy consumption can be reduced by 35%.

The higher temperatures in the primary flame can also be used to reduce the bulk density, since the raw perlite particles become softer and are inflated to a greater extent by the evaporating water of hydration.

THE DRAWINGS

The apparatus according to the invention and the process according to the invention will now be explained using figures (FIG. 1 to FIG. 5) and by examples and comparative examples.

DETAILED DESCRIPTION

Figure 1:
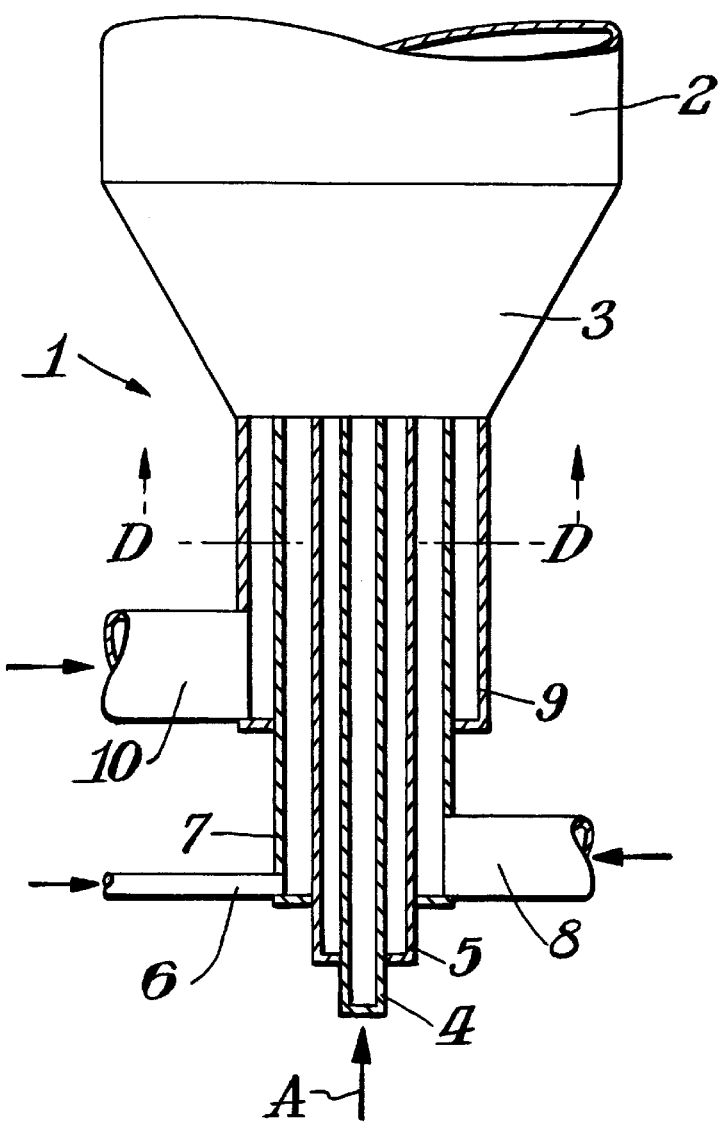
FIG. 1 shows a detail of the apparatus according to the invention for producing perlite granules, having a burner which is arranged at the lower end of an expansion tube.

FIG. 1 illustrates the lower section of an updraft reactor according to the invention. The burner 1 is arranged on the expansion tube 2 at its lower, conically tapering end 3. The fuel is fed to the burner via a centrally arranged single fuel nozzle 4. Oxygen is fed through an annular-gap oxygen nozzle 5, arranged concentrically around the single fuel nozzle 4, via a connecting piece 6. Arranged concentrically around the annular-gap oxygen nozzle 5 is a primary air nozzle 7, which is fed air via the connecting piece 8 and which is surrounded concentrically by a secondary/additional air nozzle 9 having a connection piece 10. The feed or blowing-in direction of the materials is illustrated here by the arrow A.

Figure 2:
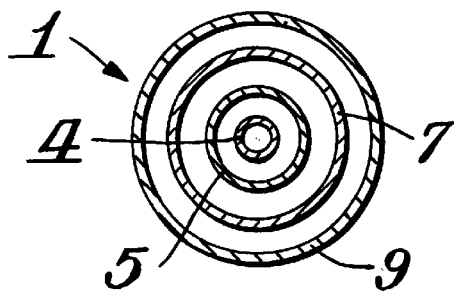
FIG. 2 shows a cross section of the burner illustrated in FIG. 1.

FIG. 2 shows a cross section of the burner 1 in the plane of the area D to D' illustrated in FIG. 1. Arranged concentrically inside one another and around the longitudinal axis of the burner 1 are the single fuel nozzles 4, the annular-gap oxygen nozzle 5, the primary air nozzle 7 and the secondary/additional air nozzle 9. The respective associated connecting pieces are not illustrated here.

Figure 3:
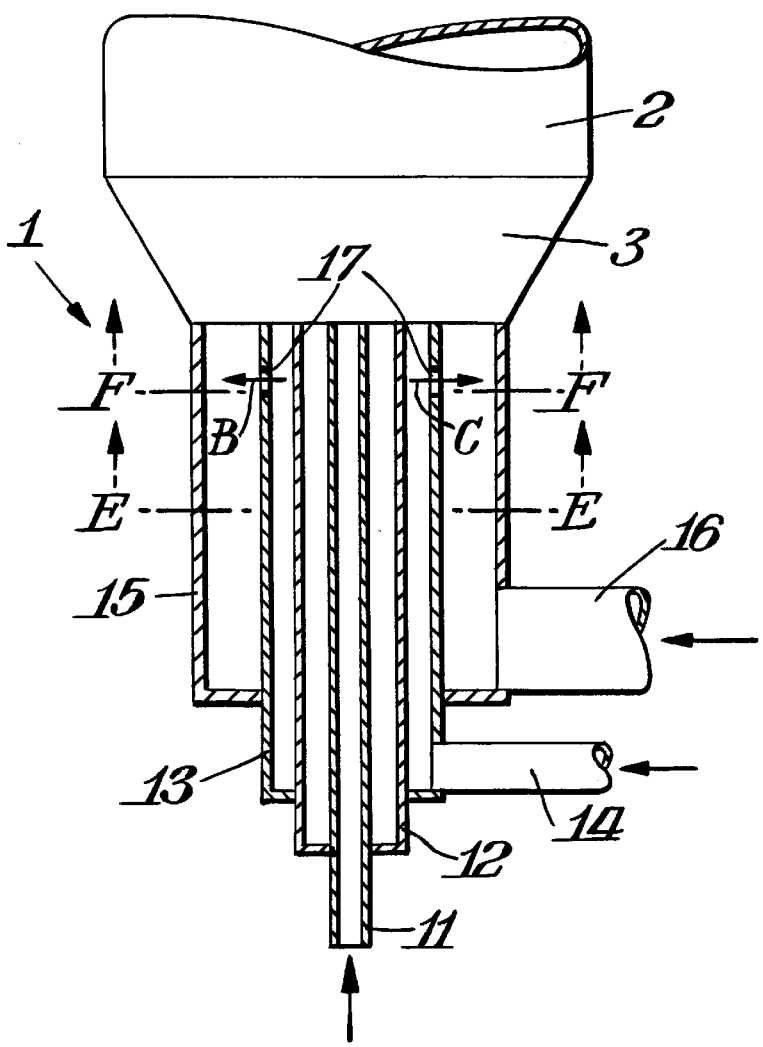
FIG. 3 shows a modification of the burner illustrated in FIG. 1.

FIG. 3 illustrates the lower section of an updraft reactor with a modification to the burner 1 according to the invention. The burner 1 is arranged on the expansion tube 2 at its lower, conically tapering end 3. Oxygen is fed to the burner via a centrally arranged single oxygen nozzle 11. Arranged concentrically around the single oxygen nozzle 11, as an annular-gap nozzle, is a secondary/additional air nozzle 12. Fuel is here fed through an annular-gap fuel nozzle 13 and via the connecting piece 14, the annular-gap fuel nozzle 13 being arranged concentrically around the secondary/additional air nozzle 12. Arranged concentrically around the annular-gap fuel nozzle 13 is a primary air nozzle 15, which is fed air via the connecting piece 16, the fuel nozzle 13 having nozzle openings 17 through which fuel passes into the primary air nozzle (arrows C and B).

Figure 4:
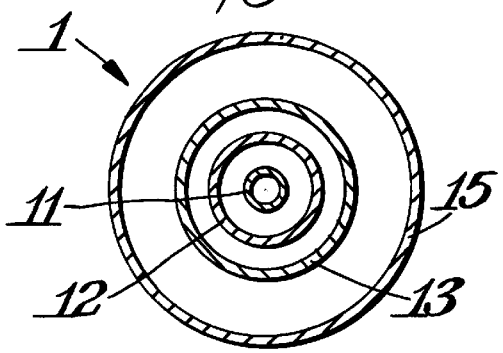
FIG. 4 shows a cross section of the burner illustrated in FIG. 3.

FIG. 4 illustrates a cross section of the burner 1 in the plane of the surface E to E' in FIG. 3. Arranged concentrically inside one another and around the longitudinal axis of the burner 1 are the single oxygen nozzle 11, the secondary/additional air annular-gap nozzle 12, the annular-gap fuel nozzle 13 and the primary air nozzle 15. The respective associated connecting pieces are not illustrated here.

Figure 5:
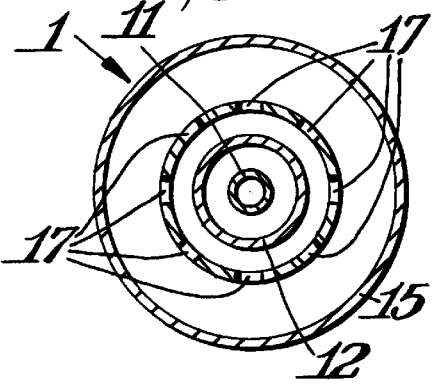
FIG. 5 shows another cross section of the burner illustrated in FIG. 3.

FIG. 5 shows a cross section of the burner 1 in the plane of the surface F to F' illustrated in FIG. 3. Arranged concentrically inside one another and around the longitudinal axis of the burner 1 are the single oxygen nozzle 11, the secondary/additional air annular-gap nozzle 12, the annular-gap fuel nozzle 13 and the primary air nozzle 15, it being possible here to see the nozzle openings 17 of the annular-gap fuel nozzle 13.

COMPARATIVE EXAMPLE 1

An updraft reactor having an expansion tube diameter of about 630 mm and a conical bas is used to produce perlite granules from raw perlite with a coarse grain size of 0.6 mm.

170 m$^3$/h natural gas with 640 m$^3$/h primary air are burned as fuel by an externally mixing burner, which is flange-mounted to the conical base. The natural gas is blown transversely into the primary air stream via a number of single nozzles. In addition, about 1200 m$^3$/h secondary and additional air at a suction draft pressure of about 55 mm water gage is sucked in through the secondary air nozzle by a suction draft blower on the exhaust gas side.

The raw perlite is metered into the flame by a metering device through two openings in the expansion tube. After the furnace has been optimized, 12.34 m³/h perlite granules with a bulk density of 77 kg/m³ are separated as the product in the cyclone and filter. The specific energy consumption is 13.92 m³ of natural gas for each m³ of perlite. The temperature of the expansion tube is a maximum of 805° C. 1500 mm above the burner nozzle.

COMPARATIVE EXAMPLE 2

Using the updraft reactor according to comparative example 1, with the same grain size of the raw perlite of 0.6 mm, the primary air was enriched with oxygen.

The amount of primary air was reduced to 450 m³/h and enriched with a maximum of 40 m³/h of oxygen to 27.4% by volume of oxygen. After the furnace had been optimized, a maximum of 15.06 m³/h perlite granules with a bulk density of 79.4 kg/m³ were separated as the product in the cyclone and filter. The specific energy consumption is 11.37 M³ natural gas for each m³ of perlite, at a specific oxygen consumption of 2.66 m³ of oxygen for each m³ of perlite. Higher amounts of oxygen were not possible, since the upper permissible limiting value of the wall temperature was exceeded, and unexpanded raw perlite fell through the burner.

EXAMPLE 1

Instead of enriching the primary air with oxygen, an oxygen nozzle was incorporated centrally into the existing primary air nozzle. At an oxygen volume flow of 50 m³/h, which means a nozzle exit velocity of 33.5 m/s, the amount of primary air was throttled to 363 m³/h at a constant natural gas throughput of 170 m³/h. About 1200 m³/h secondary/additional air was sucked in via the secondary air nozzle.

After the furnace had been optimized, 18.56 m³/h of perlite granules having a bulk density of 64 kg/M³ were separated as the product in the cyclone and filter. The specific energy consumption is 9.26 m³ of natural gas for each m³ of perlite, and the specific oxygen requirement is 2.69 m³ of oxygen for each m³ of perlite.

The temperature of the expansion tube is a maximum of 790° C. 1500 mm above the burner nozzle.

As a result of feeding in oxygen according to the invention, an increase of 50.4% in the perlite throughput was possible. The natural gas consumption was reduced by 35%.

EXAMPLE 2

An oxygen nozzle was incorporated into the existing primary air nozzle in the burner and, with an oxygen volume flow of 50 m³/h, produced an exit velocity of 69.1 m/s. Under otherwise identical conditions to those in Example 1, the throughput of perlite granules was reduced to 16.9 m³/h with a bulk density of 67.4 kg/m³.

The specific energy consumption rose to 10.18 m³ of natural gas for each m³ of perlite, and the specific oxygen consumption was increased to 2.96 M³ of oxygen for each m³ of perlite.

EXAMPLE 3

By reducing the nozzle cross section, the oxygen exit velocity was increased still further. Under otherwise identical conditions to those in Example 1, but with an oxygen exit velocity of 150 m/s, the throughput of perlite granules was reduced to 14.58 M³/h at a specific natural gas consumption of 11.65 m³ of natural gas for each m³ of perlite and an oxygen requirement of 3.43 m³ of oxygen for each m³ of perlite.

What is claimed is:

1. An apparatus for producing perlite granules, having an expansion tube and one or more gas burners arranged at one end of the expansion tube, in which apparatus the combustion air is blown into the flame through one or more combustion air nozzles, wherein an additional subsonic nozzle is arranged in at least one combustion air nozzle, the subsonic nozzle is a central nozzle which is coaxially surrounded by the at least one combustion air nozzle, and the subsonic nozzle is a nozzle for oxygen or oxygen enriched air.

2. The apparatus as claimed in claim 1, wherein the combustion air is blown into the flame through at least one primary air nozzle and at least one secondary air nozzle, and wherein the additional subsonic nozzle is arranged in at least one the primary air nozzle and the secondary air nozzle.

3. The apparatus as claimed in claim 2, wherein the additional subsonic nozzle ends flush with one of a fuel gas nozzle and the primary air nozzle.

4. The apparatus as claimed in claim 1, wherein the additional subsonic nozzle is arranged axially in one or more nozzles.

5. The apparatus as claimed in claim 1, wherein the additional subsonic nozzle ends flush with one of a fuel gas nozzle and the primary air nozzle.

6. In a process for expanding raw perlite in the updraft from a flame of one or more gas burners, with the introduction of oxygen or oxygen-enriched air into this flame, the improvement being in introducing the oxygen or oxygen-enriched air axially into the flame through subsonic nozzles, and exiting the oxygen or of the oxygen-enriched air at a velocity of 5 m/s to 100 m/s.

7. The process as claimed in claim 6, wherein the oxygen-enriched air contains at least 50% by volume of oxygen.

* * * * *